US008279482B2

(12) United States Patent
Tomizuka et al.

(10) Patent No.: US 8,279,482 B2
(45) Date of Patent: Oct. 2, 2012

(54) METHOD OF PRINTING MULTIPLE MAGNIFICATIONS OF PAGES PER SHEET IN N-UP PRINTING

(75) Inventors: Takashi Tomizuka, Niigata (JP); Takashi Oda, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1507 days.

(21) Appl. No.: 11/581,411

(22) Filed: Oct. 17, 2006

(65) Prior Publication Data
US 2007/0201070 A1 Aug. 30, 2007

(30) Foreign Application Priority Data

Feb. 28, 2006 (JP) ................................. 2006-053150

(51) Int. Cl.
*G06K 15/00* (2006.01)
(52) U.S. Cl. ........ 358/1.16; 345/472; 358/1.18; 358/1.2
(58) Field of Classification Search .................. 358/1.16, 358/1.18, 1.2, 1.9, 450, 451; 345/472; 400/76; 715/200
See application file for complete search history.

(56) References Cited

U.S. PATENT DOCUMENTS

| | | | | |
|---|---|---|---|---|
| 4,505,561 A | * | 3/1985 | Beckman et al. | 396/338 |
| 5,842,793 A | * | 12/1998 | Katayama et al. | 400/88 |
| 2003/0160975 A1 | * | 8/2003 | Skurdal et al. | 358/1.2 |
| 2004/0095587 A1 | * | 5/2004 | Brown et al. | 358/1.2 |
| 2004/0174563 A1 | * | 9/2004 | Cassidy et al. | 358/1.18 |

FOREIGN PATENT DOCUMENTS

| | | | |
|---|---|---|---|
| JP | 08329062 A | * | 12/1996 |
| JP | 2000-148429 A | | 5/2000 |
| JP | 2003231325 A | * | 8/2003 |
| KR | 10-2005-0051990 A | | 6/2005 |

OTHER PUBLICATIONS

Machine Translation of JP8-329062.*
Machine Translation of JP2003-231325.*
Machine Translation of KR10-2005-0051990 (noted in the Applicant's IDSof Apr. 15, 2008).*

* cited by examiner

*Primary Examiner* — King Poon
*Assistant Examiner* — David S Cammack
(74) *Attorney, Agent, or Firm* — Sughrue Mion, PLLC

(57) ABSTRACT

A computer readable recording medium storing a program causing a computer to execute a process for a combination printing function for collectively printing out contents of plural pages into one page, the process which includes selecting a test printing target page from printing target data, generating image data in which at least two pages regarding the selected page are reduced to different scales and are collected into one page, and transmitting the generated image data to a printing device.

23 Claims, 14 Drawing Sheets

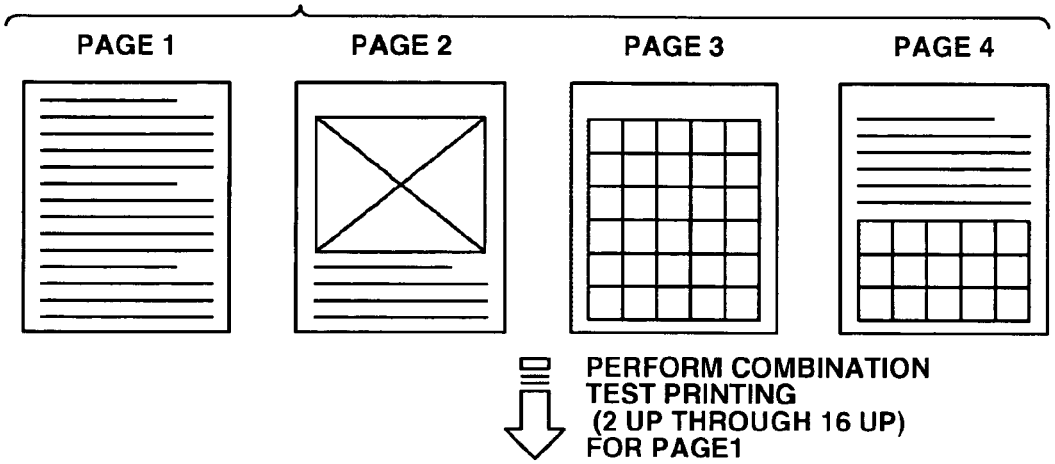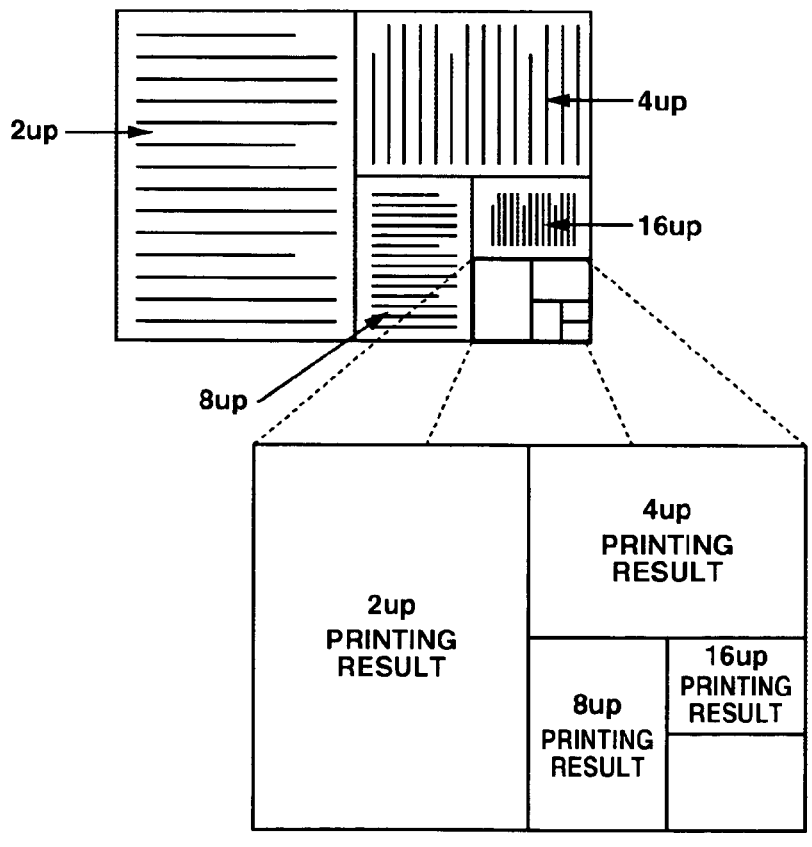
FIG.4

● DIAGRAM SHOWING AN OUTLINE OF COMBINATION TEST PRINTING IN PAGE DESIGNATION MODE (PAGE 3 IS DESIGNATED)
FOUR ORIGINAL DOCUMENTS OF A4 PAPER IN PORTRAIT ORIENTATION
| PAGE 1 | PAGE 2 | PAGE 3 | PAGE 4 |
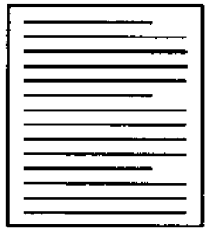 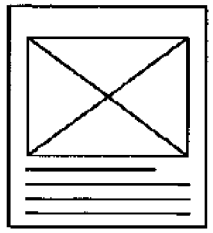 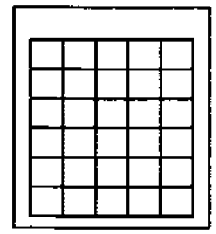 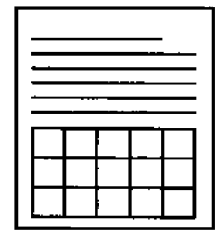
DESIGNATING PAGE 3
COMBINATION TEST PRINTING FOR ONE ORIGINAL DOCUMENT OF A4 PAPER IN LANDSCAPE ORIENTATION
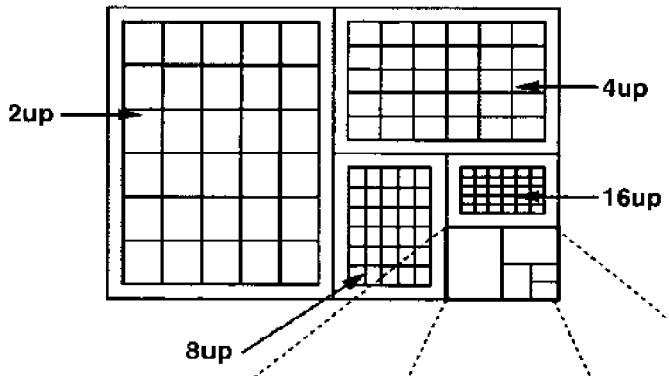
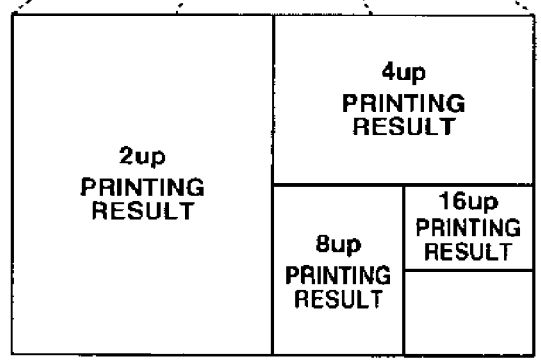
DISPLAY COLUMN SHOWING N-up TYPES IN COMBINATION TEST PRINTING
FIG.5

● DIAGRAM SHOWING AN OUTLINE OF COMBINATION TEST PRINTING IN LETTER RECOGNITION MODE (SMALLEST CHARACTER)
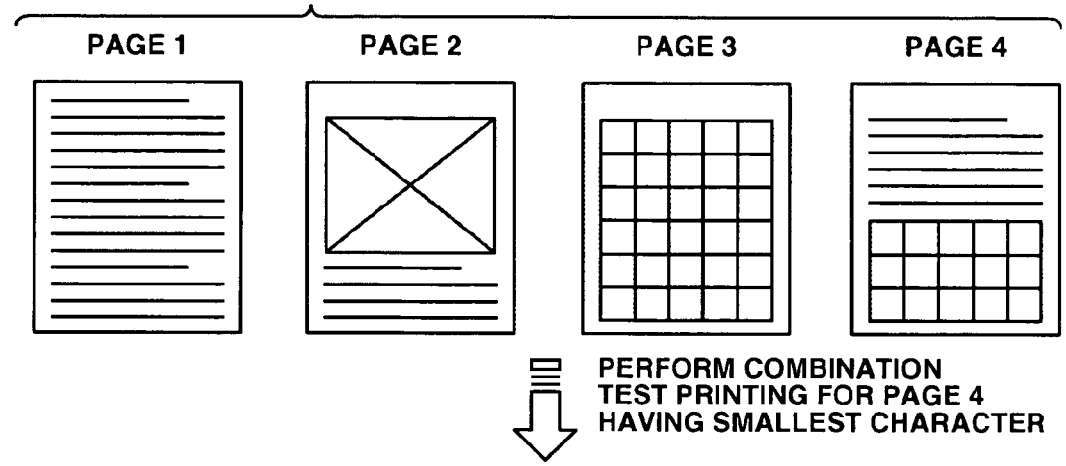
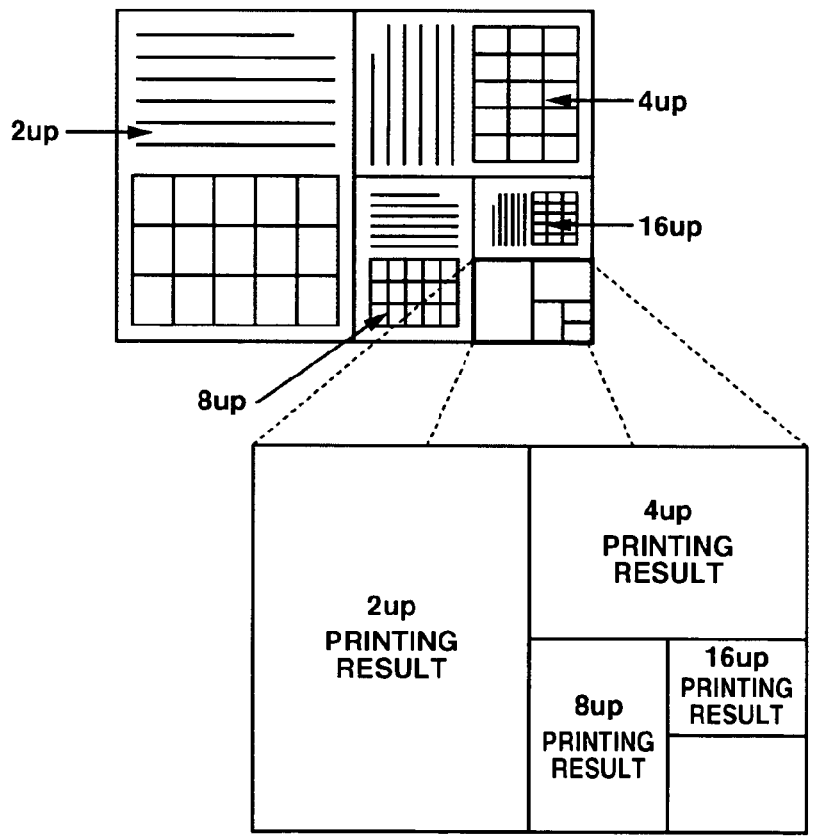
FIG.6

● DIAGRAM SHOWING OUTLINE IN A CASE WHERE COMBINATION TEST PRINTING IS PERFORMED USING BOTH SIDES ( MODIFICATION)
<FRONT SIDE>
PERFORM COMBINATION TEST FOR PAGE 1
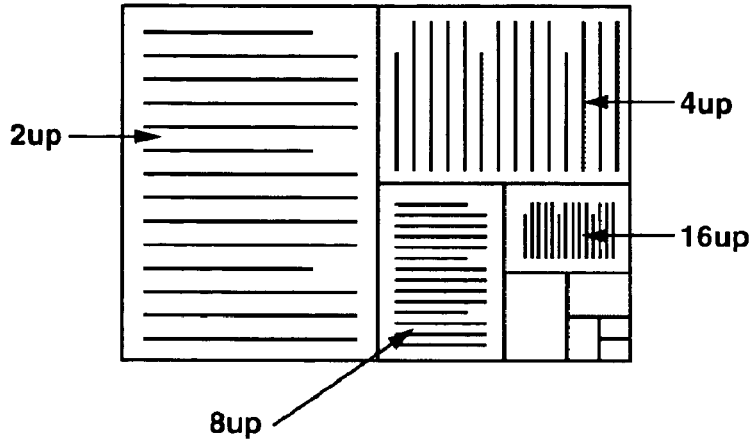
<REVERSE SIDE>
PERFORM COMBINATION TEST FOR PAGE 3
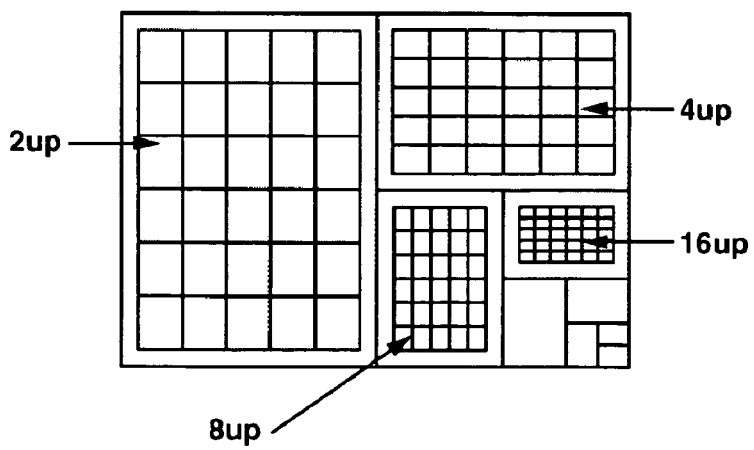
FIG.11

● DIAGRAM SHOWING OUTLINE IN A CASE WHERE
  COMBINATION TEST PRINTING IS PERFORMED
  USING BOTH SIDES ( MODIFICATION)

<FRONT SIDE>
PERFORM COMBINATION TEST FOR PAGE HAVING
SMALLEST CHARACTER SIZE

COMBINATION TEST PRINTING IN
LANDSCAPE ORIENTATION

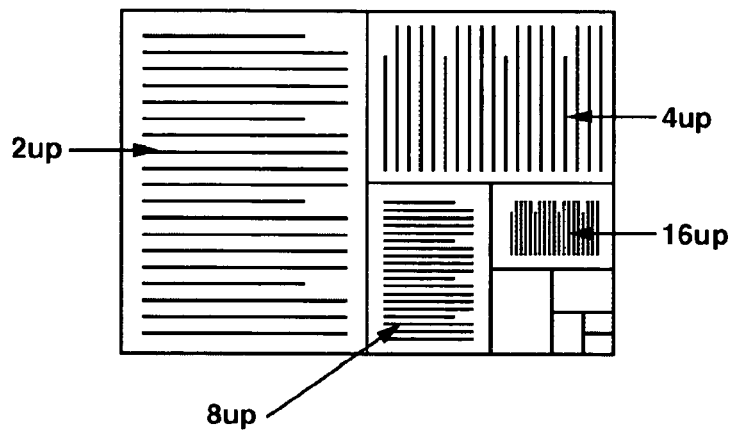

<REVERSE SIDE>
PERFORM COMBINATION TEST FOR PAGE HAVING
SECOND SMALLEST CHARACTER SIZE

COMBINATION TEST PRINTING IN
LANDSCAPE ORIENTATION

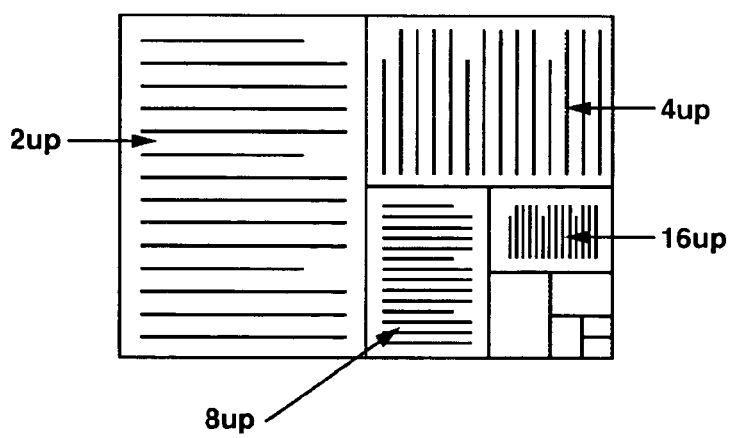

FIG.12

● DIAGRAM SHOWING OUTLINE IN A CASE WHERE COMBINATION TEST PRINTING IS PERFORMED USING BOTH SIDES ( MODIFICATION)
<FRONT SIDE>
COMBINATION TEST PRINTING IN LANDSCAPE ORIENTATION
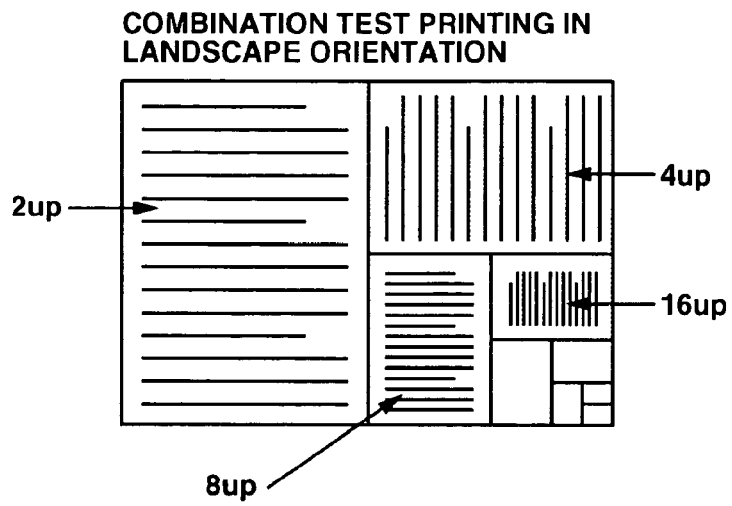
<REVERSE SIDE>
PERFORM ORDINARY PRINTING
(NO N-up)
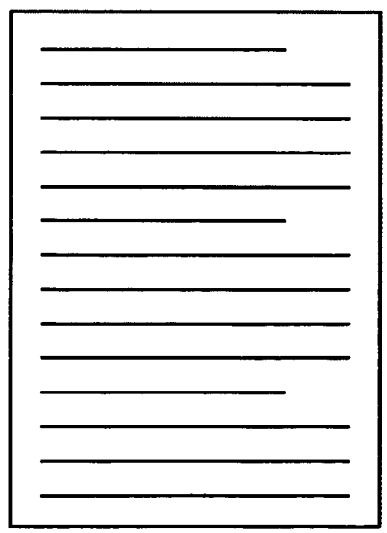
FIG.13

METHOD OF PRINTING MULTIPLE MAGNIFICATIONS OF PAGES PER SHEET IN N-UP PRINTING

BACKGROUND

1. Technical Field

The present invention relates to a recording medium storing a printer driver, a test printing method of the printer driver, a printing device, and a computer data signal embodied in a carrier wave, the printer driver having a combination printing function for printing out one page into which contents of plural pages are included, and particularly relates to the recording medium storing the printer driver, the test printing method of the printer driver, the printing device, and the computer data signal embodied in a carrier wave, which are adapted to output test printing in which combination printing settings with plural stages regarding a specific page are integrated into one page.

2. Related Art

Conventionally, an N-up function (combination printing function) that collectively prints contents of N pages into one page has been known. Through this function, saving sheets of paper can be achieved. Additionally, a readability of printed materials can be improved because of an increase of volume of information per page.

Using the N-up function, generally, it is possible to combine into 2 up to 16 up. However, if the N-up is performed at user's desirable reduction rate, there is a possibility that a character cannot be recognized since the size of the character in the printed material is too small. In this case, since reprinting is necessary, far from saving printing sheets of paper, useless printed materials are to be increased.

SUMMARY

According to an aspect of the invention, there is provided a computer readable recording medium storing a printer driver having a combination printing function causing a computer to execute a process for collectively printing out contents of a plurality of pages into one page, the process which includes, selecting a test printing target page from printing target data, generating image data in which at least two pages regarding the selected page are reduced to different scales and are collected into one page, and transmitting the generated image data to a printing device.

BRIEF DESCRIPTION OF THE DRAWINGS

An exemplary embodiment of the present invention will be described in detail based on the following figures, wherein:

FIG. 4 is a diagram showing an outline of combination test printing (default mode);

FIG. 5 is a diagram showing an outline of the combination test printing (page designation mode);

FIG. 6 is a diagram showing an outline of the combination test printing (character recognition mode);

FIG. 11 is a diagram showing an outline of a modification pertaining to the present invention (page designation mode: combination test printing);

FIG. 12 is a diagram showing an outline of a modification pertaining to the present invention (character recognition mode: combination test printing);

FIG. 13 is a diagram showing an outline of a modification pertaining to the present invention (ordinary printing on the reverse side)

DETAILED DESCRIPTION

Hereinbelow, an exemplary embodiment of a recording medium storing a printer driver, a test printing method of the printer driver, a printing device, and a computer data signal embodied in a carrier wave pertaining to the present invention will be described in detail with reference to the attached drawings.

Figure 1:
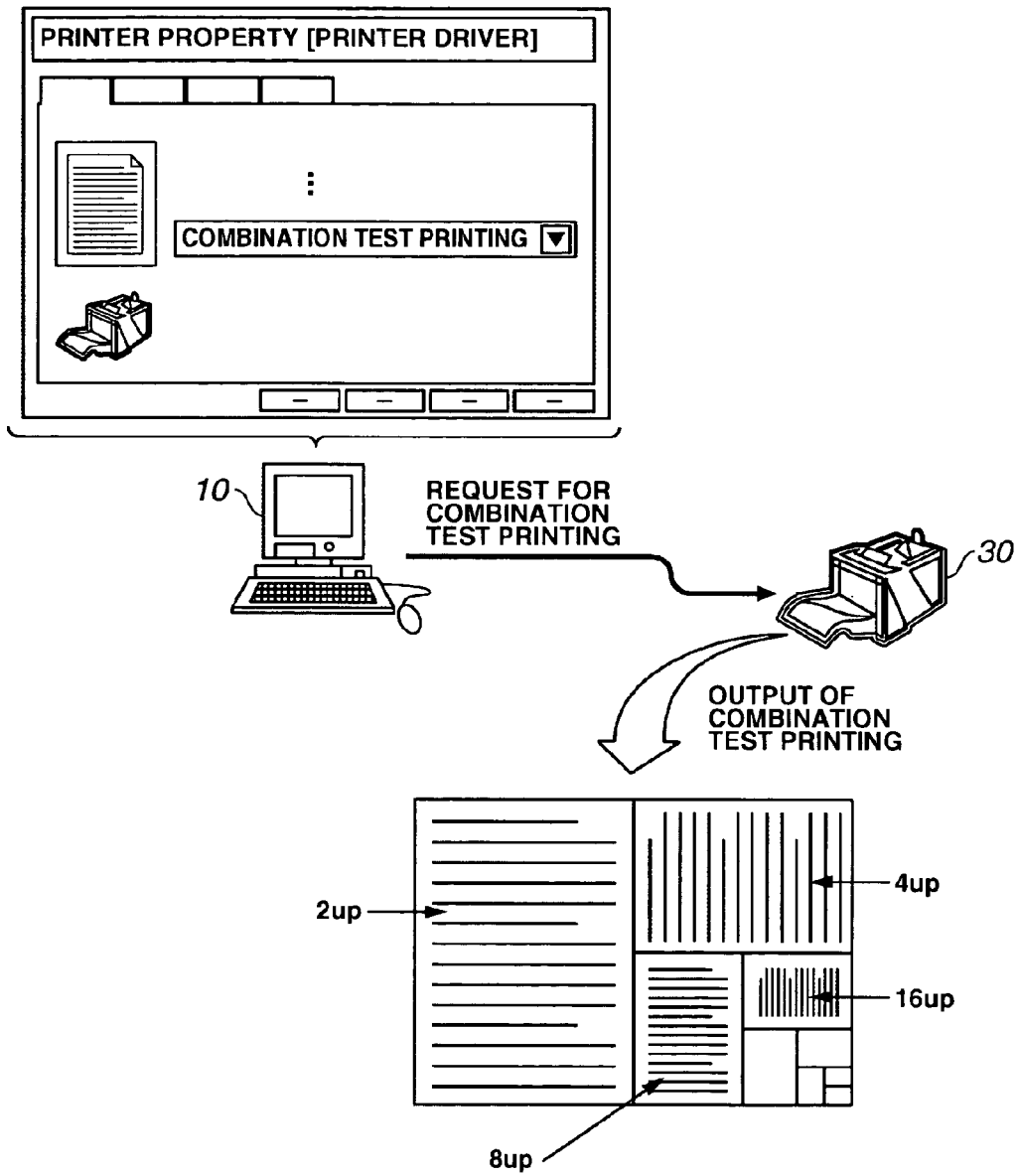
FIG. 1 is a diagram showing an example of a general configuration of a printing system including a host terminal 10 to which a printer driver related to the present invention is applied.

FIG. 1 is a diagram showing an example of the general configuration of a printing system including a host terminal 10 having the printer driver related to the present invention. Additionally, in this explanation, only constituting units pertaining to the present invention will be described.

This printing system is configured to include the host terminal 10 that outputs printing data to a printer 30, and the printer 30 that forms and prints out an image to a recording medium such as a sheet of paper on the basis of the printing data from the host terminal 10.

The printer driver is installed in the host terminal 10 in advance. Through this printer driver, a document or other print targets are converted into a page description language that the printer 30 can interpret, and the printing data obtained by the conversion is outputted to the printer 30.

In this printer driver, a combination test printing function that presents a characteristic of the present invention is provided. This printing function makes it possible to perform combination test printing in which N-up settings with plural stages for a specific page are collectively printed into one page, the specific page being included in data having one or more plural pages to be printed.

In other words, when a user performs this combination test printing before printing, the user can refer to the result of the test printing to confirm for each of the N-up settings whether collapse of a character occurs or not. As a result, the user can perform printing with an N-up setting that is best suited to the specific page.

Figure 2:
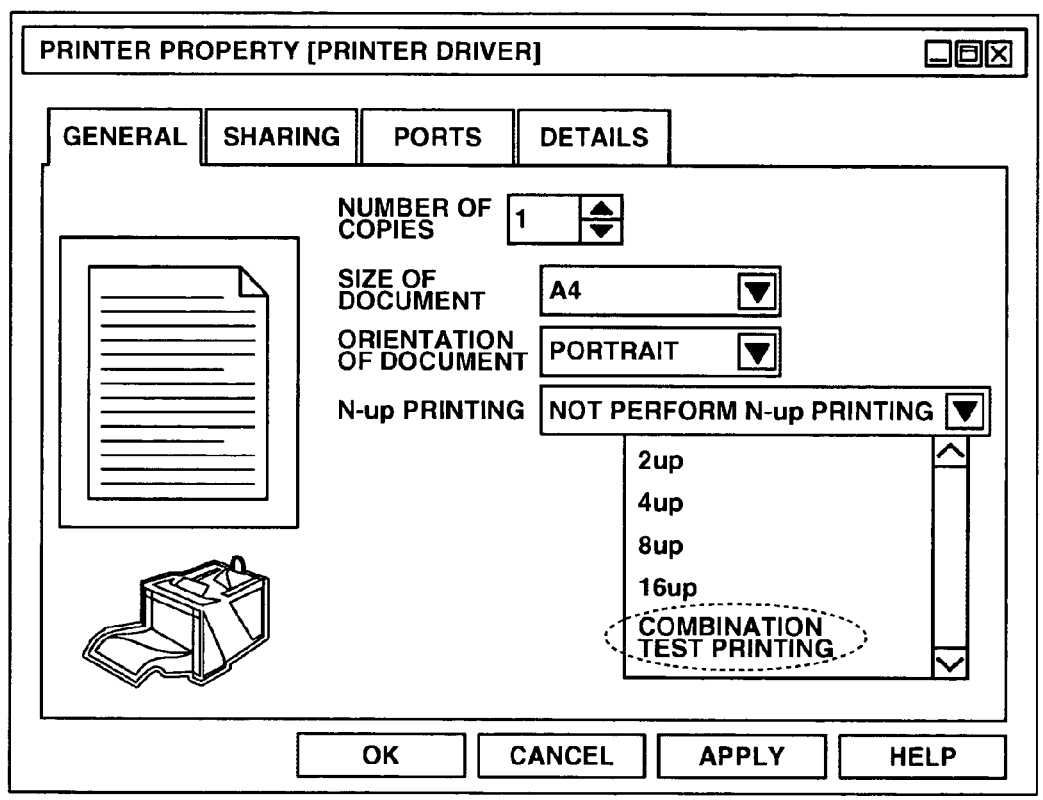
FIG. 2 is a diagram showing an example of a screen display of the printer driver.

When the combination test printing is performed, predetermined operations are carried out using a printer driver display shown in FIG. 2. In these operations, the user designates a mode from among a default mode, a page designation mode, and a character recognition mode.

Firstly, when the combination test printing is performed, a "combination test printing" item is selected from a list box (bounded by a broken line in FIG. 2) that is provided for an "N-up printing" item on the printer driver display.

Figure 3:
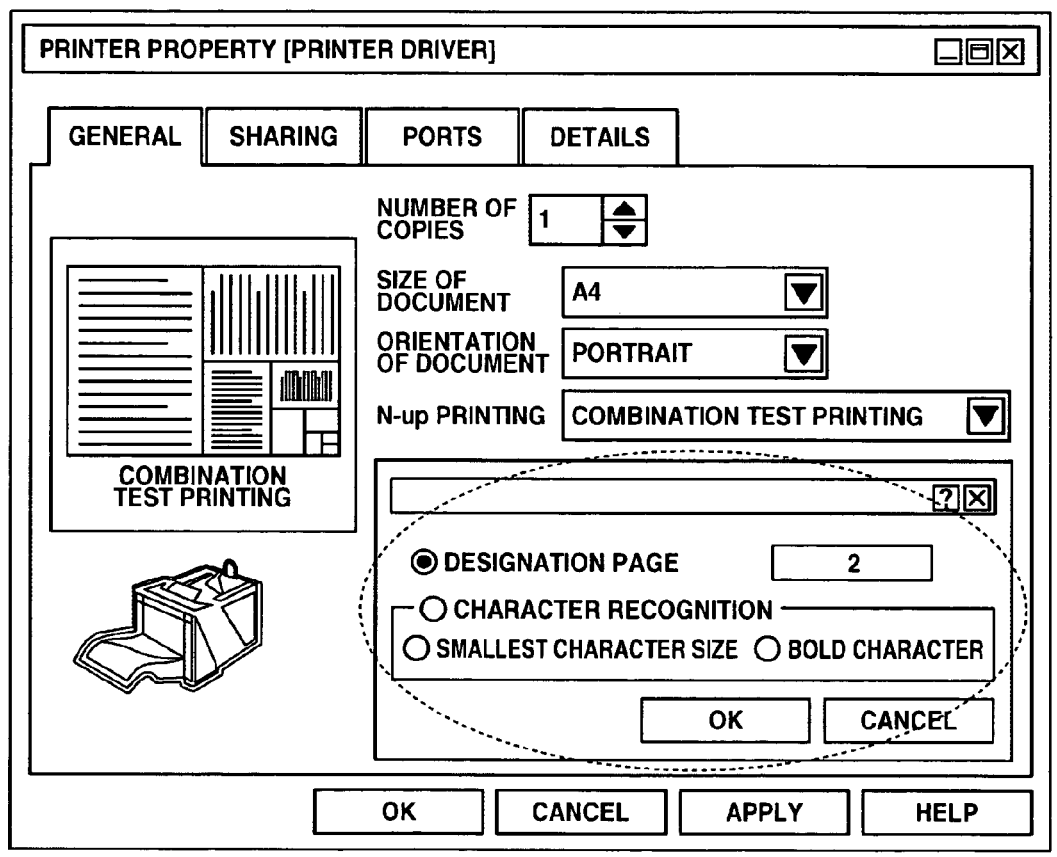
FIG. 3 is a diagram showing an example of a screen display of the printer driver (display of a dialog box)

By this selection operation, a dialog box that is shown in FIG. 3 (bounded by a broken line in FIG. 3) is displayed.

When an instruction for the combination test printing is given (depressing an OK button on the printer driver display), a test printing is performed in the default mode. Furthermore, when any of radio boxes that are respectively provided for a "designation page" item and a "character recognition" item on the dialog box is selected and the OK button on the dialog is depressed, the combination test printing in the page designation mode can be performed in a case that the "designation page" is designated, and the combination test printing in the character recognition mode can be performed in a case that the "character recognition" is designated. Additionally, when the "designation page" is selected, the number of pages is further to be inputted. And when the "character recognition" is selected, either a "smallest character size" item or a "bold character" item in the radio box (the radio box may be replaced with a check box (plural items can be selectable)) is selected.

When the combination test printing is performed in the default mode, as shown in FIG. 4, the combination test printing for a first page in printing target data is performed. In an example shown in FIG. 4, the combination test printing is performed for printing target data including four original documents of A4 paper. In this case, since printing is performed in the default mode, a combination test printing result for page 1 (first page) is outputted. As mentioned earlier, this default mode is an initial setting, and is applied when a user does not designate any mode.

Additionally, in this exemplary embodiment, the combination test printing is performed for the first page in the default mode. However, this default value can be changed as appropriate, and it is possible to operate such that, for example, the second page is the default value because it is often the case that the first page is a cover page.

Next, when the combination test printing is performed in the page designation mode, as shown in FIG. 5, the combination test printing is performed for the specific page designated by the user. In the example shown in FIG. 5, the combination test printing is performed for printing target data having four original documents of A4 paper, and a combination test printing result for page 3 (third page) that is designated by the user is outputted.

Additionally, when the combination test printing is performed in the character recognition mode, as shown in FIG. 6, the combination test printing is performed for a page having a specific character. This specific character is a character of which a collapse is likely to occur, such as a bold-faced character (bold font type in this exemplary embodiment) or the smallest size of character in the printing target data (smallest character). In one example shown in FIG. 6, the combination test printing is performed for the printing target data having four original documents of A4 paper, and the combination test printing result is outputted for page 4 (fourth page) having the smallest character.

Using FIG. 4 through FIG. 6, the outline of the combination test printing in accordance with each mode has been described. In these cases, since the printing target data is in a portrait orientation, the combination test printing is performed in a landscape orientation. On the other hand, if the printing target data is in the landscape orientation, the combination test printing is performed in the portrait orientation.

Additionally, in an empty space in the printed result of the combination test printing, a display column showing N-up setting rates in the combination test printing is provided. By referring to this display column, the user can easily know which part in the combination test printing corresponds to which N-up printing.

Figure 7:
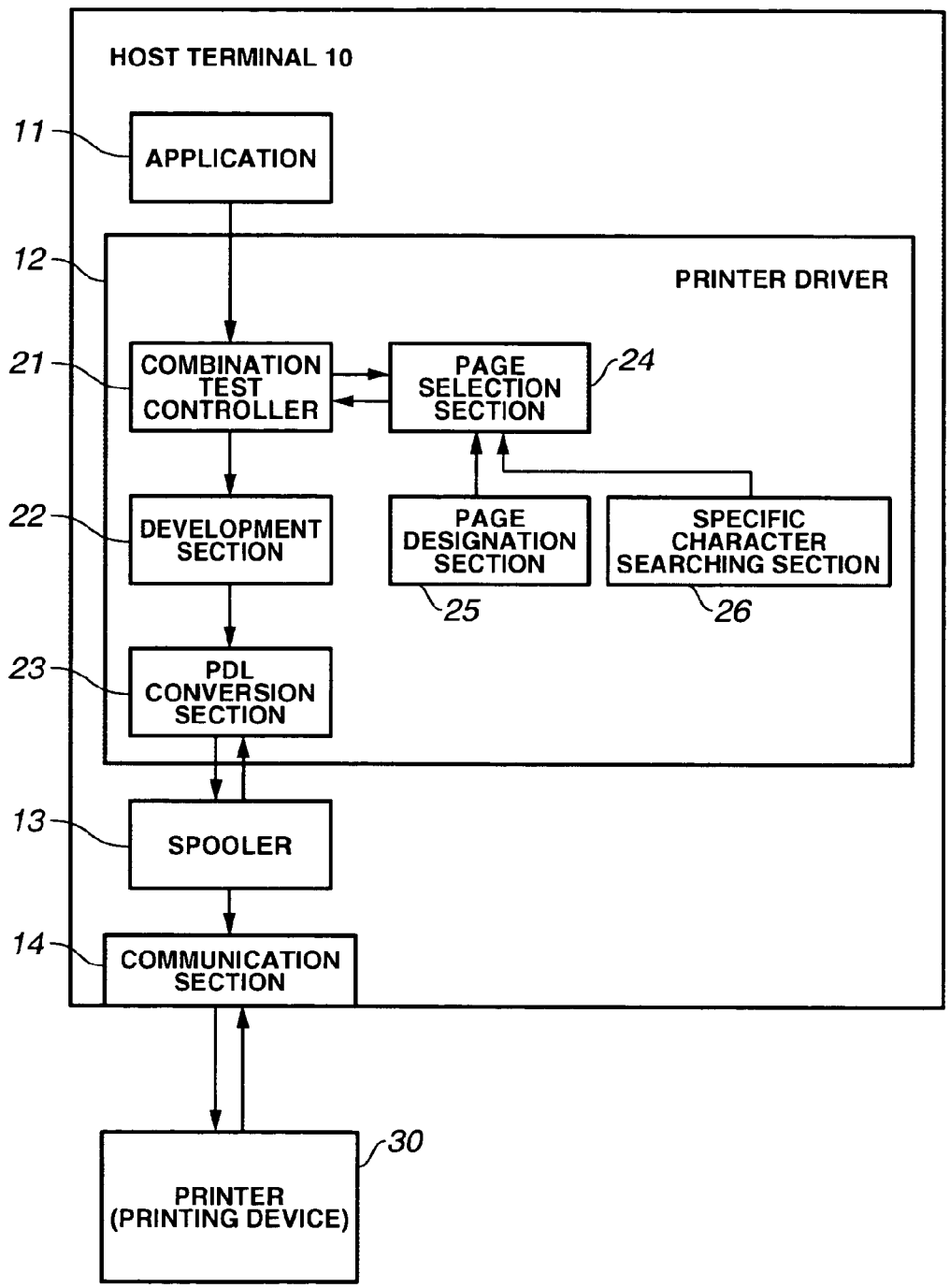
FIG. 7 is a diagram showing a part of a functional configuration of the host terminal 10 shown in FIG. 1.

Next, using FIG. 7, a part of the functional configuration of the host terminal 10 shown in FIG. 1 will be described.

The host terminal 10 is configured to include: an application 11 that performs creation and compilation or the like of printing target data; a printer driver 12 that generates printing data by converting the printing target data into data in a form that the printer 30 can interpret; a spooler 13 that conducts transmission control of the generated printing data; and a communication section 14 that performs a function of a communication interface connecting the host terminal 10 and the printer 30.

When printing is performed, the application 11 sends the printing target data of a document, etc. to the printer driver 12. The printing driver 12 generates printing data by converting the printing target data received from the application 11 into the page description language that the printer 30 can interpret, and sends the printing data to the spooler 13. The spooler 13 transmits the printing data received from the printer driver 12 to the printer 30 through the communication section 14.

Additionally, the printer driver 12 is configured to include a combination test controller 21, a development section 22, a PDL (Page Description Language) conversion section 23, a page selection section 24, a page designation section 25, and a specific character searching section 26.

The combination test controller 21 plays an overall controlling function regarding the combination test printing. Additionally, the development section 22 performs a function to develop the printing target data to image data. The PDL conversion section 23 performs a function to convert the image data into printing data in the page description language form that the printer 30 can interpret, and a function to carry out the transmission control of the printing data.

The page selection section 24 performs a function to select, based on the prescribed condition, a combination test target page from the printing target data. And, the selected page becomes a target page of the combination test printing.

For a method of selecting the page by the page selection section 24, generally, there are three ways: (1) selecting a first page in the printing target data, (2) selecting a page designated by a user, and (3) selecting a page having a specific character. In other words, the page selection is performed in the default mode in the case of (1), in the page designation mode in the case of (2), and in the character recognition mode in the case of (3).

In the page designation mode, the page designation section 25 obtains the designation page designated by the user using the printer driver display. The designated page is transmitted to the page selection section 24, thus the page designated by the user is selected by the page selection section 24.

Additionally, in the character recognition mode, a page having a specific character is searched from the printing target data by the specific character searching section 26, and is transmitted to the page selection section 24, thus the page having the specific character is selected by the page selection section 24.

In this exemplary embodiment, a case where printing data converted to the page description language is transmitted from the host terminal 10 to the printer 30 will be described as one example. However, the printing data is not necessarily in the form of the page description language, and this exemplary embodiment may be applicable so far the printer 30 can perform printing based on the printing data. Thus, for example, for certain printers, it may be configured such that the image data can be transmitted without any conversion process.

Figure 8:
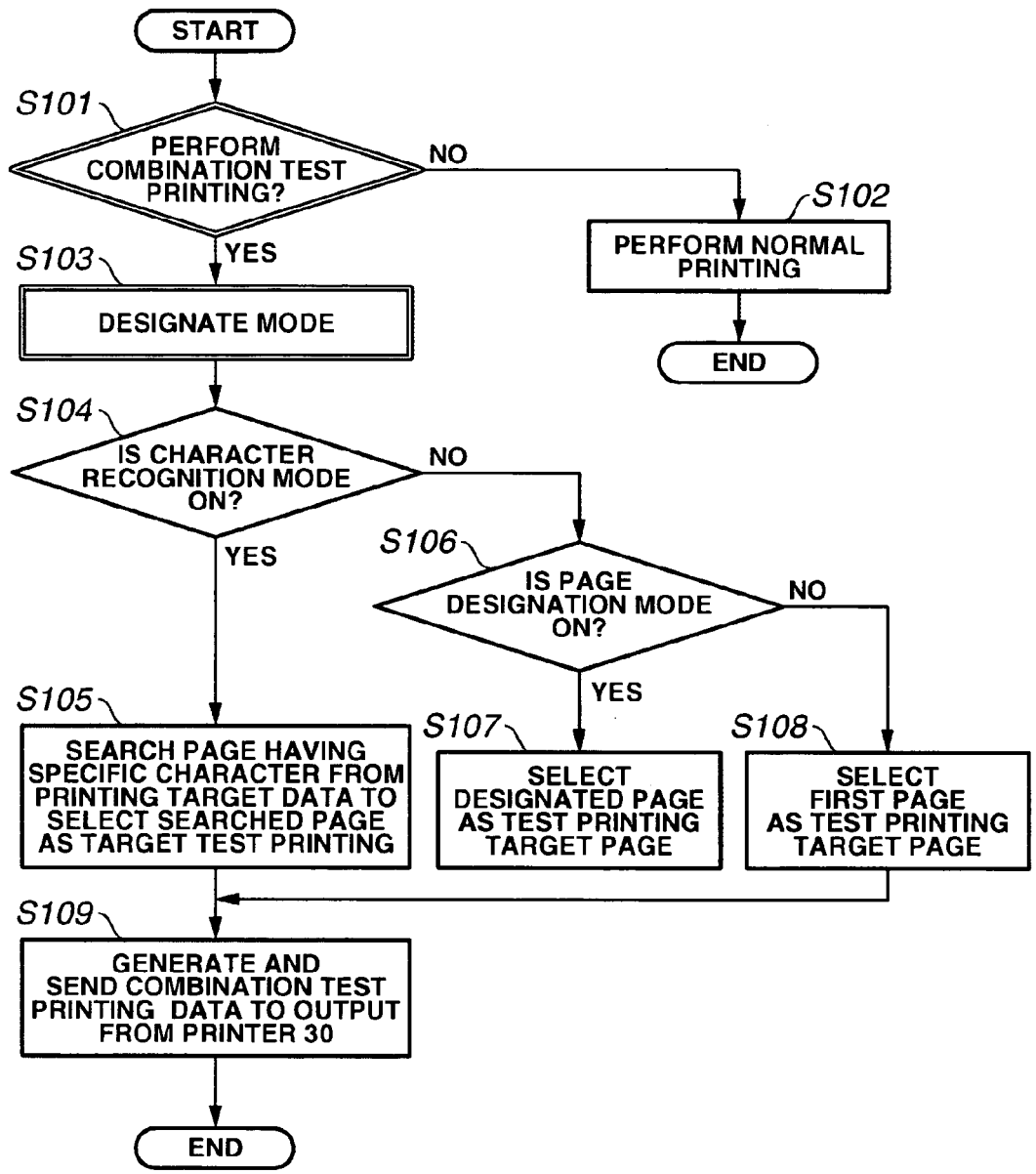
FIG. 8 is a flow chart showing an operation of a combination test printing process in the printing system shown in FIG. 1.

Next, using FIG. 8, an operation of the combination test printing process in the printing system shown in FIG. 1 will be described. In this description, a process after a printer driver is started will be described.

When the printer driver is started, the user performs a prescribed input operation from the display. If the combination test printing is not performed (NO in step S101), the ordinary printing is performed as usual (step S102), and this process ends. However, if the combination test printing is performed, the mode selection operation is carried out through the procedure described in FIGS. 2 and 3, and the mode is designated (step S103).

Here, when the user designates the mode for the combination test printing, depresses OK button, etc., and completes the input operation necessary for the combination test printing, the combination test controller 21 in the printer driver, firstly, determines which mode is selected.

As a result of the determination, if the character recognition mode is designated (YES in step S104), a page including a specific character is searched from the printing target data by the specific character recognition section 26, and the page is selected as a test printing target page by the page selection section 24 that receives the search result (step S105).

Additionally, as the result of the above-mentioned mode determination, when the page designation mode is designated (after NO in step S104, YES in step S106), the page designated by the user is obtained by the page designation section 25, and the designated page is selected as the test printing target page by the page designation section 24 that receives the obtained result (step S107).

Additionally, as the result of the above-mentioned mode determination, when the mode designation is not performed (NO in step S106), the mode becomes the default mode, and the first page is selected by the page designation section 24 from the printing target data as the test printing target page (step S108).

As stated above, when the selection of the test printing target page is completed, the combination test printing data having N-up settings with plural stages regarding the selected page in one page is generated in the development section 22. The combination test printing data is converted into the page description language in the PDL conversion section 23, and is transmitted from the spooler 13 through the communication section 14 to the printer 30. And the combination test printing (see FIG. 4 through FIG. 6) is outputted from the printer 30 (step S109).

Then, the user refers to the result of the combination test printing outputted as stated above to check, for each of the N-up settings, whether the collapse of characters occurs. As a result, the user can perform printing with an N-up setting that is best suited to the selected page.

The present invention may be embodied with any alteration being given within the scope of the gist, being not limited to the embodiment as described above with reference to the attached drawings. Hereinbelow, besides this, other modifications are listed below.

Figure 9:
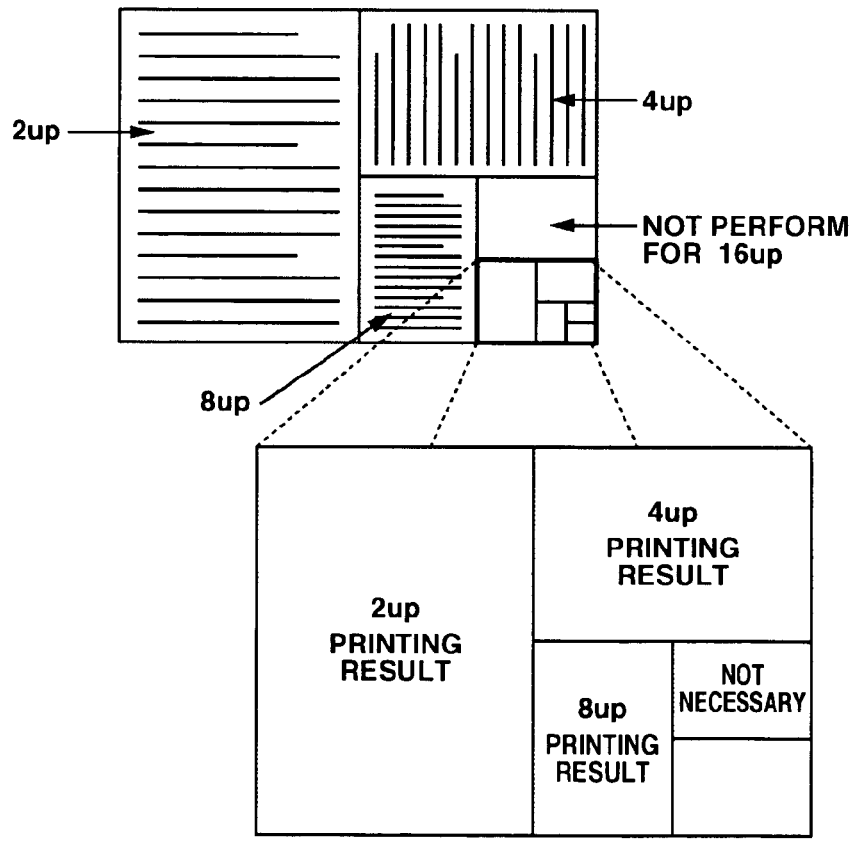
FIG. 9 is a diagram showing an outline of a modification pertaining to the present invention (changing N-up setting)

(1) The present invention may be configured to change N-up settings used for the combination test printing in accordance with the total page number of the printing target data. For example, as shown in FIG. 9, when the total page number in printing target data is eight pages, the combination test printing for 16 up is not performed because 16 up is unrelated to this printing. In this case, since the total page number is eight pages, the combination test printing with the N-up printing is performed with 2 up through 8 up. This can be realized by determining the total page number of the printing target data by the combination test controller 21. In a similar way, when the total page number of the printing target data is four pages, the N-up printing with 4 up is performed, and when the total number of the printing target data is nine or more pages, the N-up printing with 16 up is performed.

Figure 10:
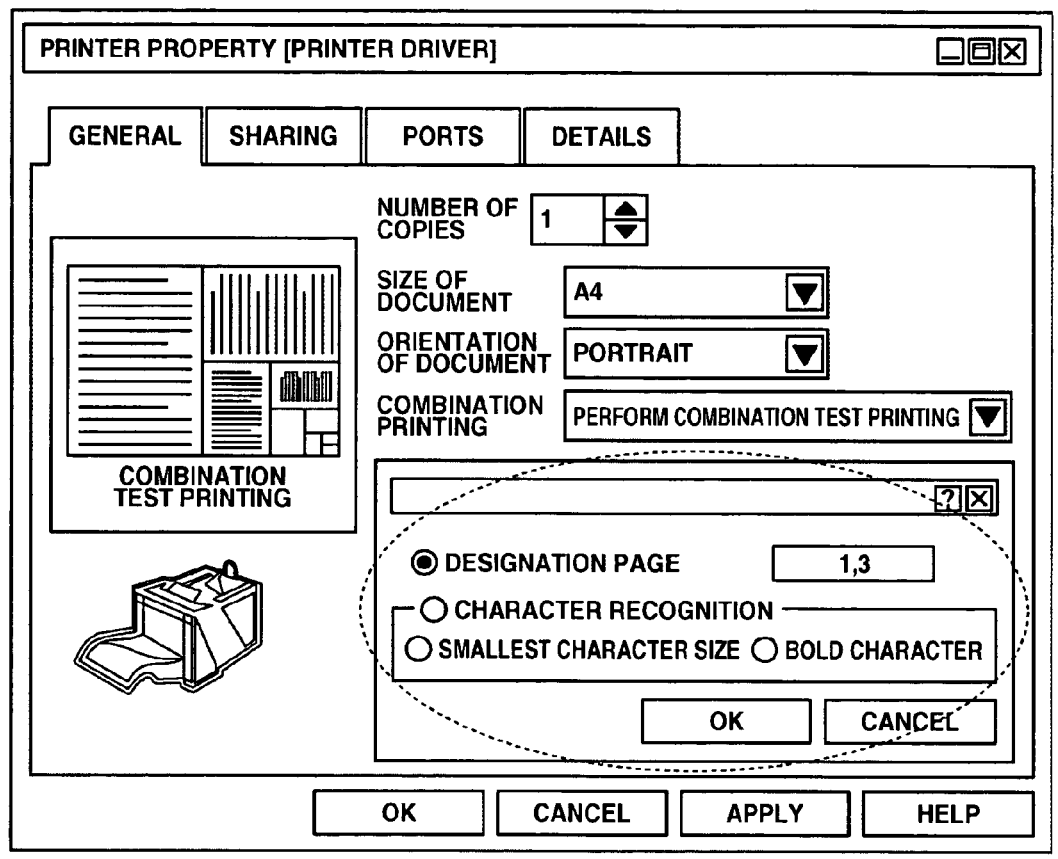
FIG. 10 is a diagram showing an outline of a modification pertaining to the present invention (page designation mode: printer driver)

(2) When the printer has a two-sided printing function, the combination test printing may be performed for the front and the reverse sides. For example, by giving an instruction to perform the test printing for two pages from the printer driver display as shown in FIG. 10 (in this case, the first and the third pages are designated using a comma-delimited format), a result of the combination test printing for each page is outputted on respective sides of the front and the reverse as shown in FIG. 11. In this case, the first and the third pages are designated to perform the combination test printing. This can be realized by sending the page designation data for two pages from the page designation section 25 to the page selection section 24, and by generating the combination test printing data for two pages by the development section 22.

Additionally, if the character recognition mode is designated, the combination test printing may also be performed for the front and the reverse sides. In this case, as shown in FIG. 12, the combination test printing for a page having the smallest character is performed on the front side, and the combination test printing for a page having a character of the second smallest size is performed on the reverse side. Further, the combination can be freely changed, and is not limited to this embodiment. For example, the printing may be performed for a page having the smallest character on the front side, and for a page having the bold font type on the reverse side.

(3) When the printer has the two-sided printing function, as shown in FIG. 13, the printing may be performed for the combination test printing on the front side, and for ordinary printing on the reverse side. In this case, not only the visibility of the N-up printing, but also that of the ordinary printing can be checked. This checking can be realized by generating, in the development section 22, the combination test printing data for the front side, and ordinary printing data for the reverse side.

Figure 14:
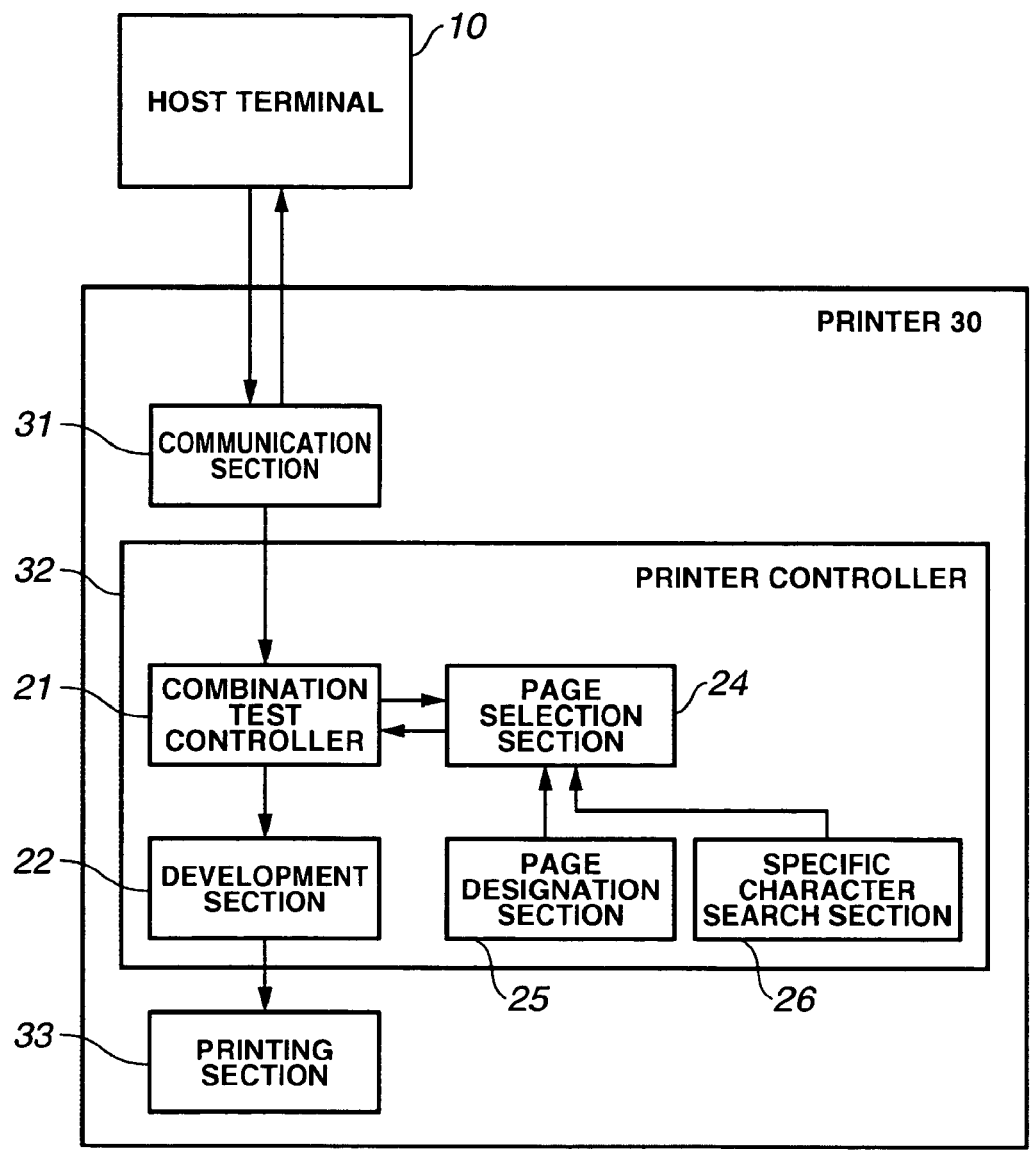
FIG. 14 is a diagram showing an outline of a modification pertaining to the present invention (printer).

(4) The combination test printing function may be provided in the printer 30 rather than in the host terminal 10. This case, as shown in FIG. 14, can be achieved by installing into the printer 30 each process function section that configures the above-mentioned printer drive 12.

The recording medium storing the printer driver, the test printing method of the printer driver, the printing device, and the computer data signal embodied in the carrier wave of the present invention are applicable to any printer driver having a combination printing function that performs printing contents of plural pages into one page, and especially, they can be effectively utilized by applying to printing environments in offices or schools, where a large volume of printing using the combination printing function is frequently performed.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a printer driver having a combination printing function causing a computer to execute a process comprising:
   selecting a test printing target page from printing target data comprising a plurality of pages;
   generating image data in which the selected test printing target page is reduced multiple times to produce a plurality of reduced images of the test printing target page having different respective scaling factors, the plurality of reduced images being collected onto one page;
   transmitting the generated image data to a printing device, and
   printing a test page using the generated image data, the test page comprising the plurality of reduced images of the test printing target page, wherein each successively smaller one of the plurality of reduced images is approximately one half a size of a next larger one of the plurality of reduced images.

2. The computer readable medium according to claim 1, wherein the process comprises,
   selecting a first page from the printing target data comprising one or more pages.

3. The computer readable medium according to claim 1, wherein the process comprises,
   selecting a page designated by a user from the printing target data comprising one or more pages.

4. The computer readable medium according to claim 1, wherein the process comprises selecting, as the test printing target page, a page having a specific character from the printing target data.

5. The computer readable medium according to claim 4, wherein the process comprises selecting, as the test printing target page, a page having a smallest character from the printing target data.

6. The computer readable medium according to claim 5, wherein the process comprises selecting, as the test printing target page, a page having a bold-type character from the printing target data.

7. The computer readable medium according to claim 4, wherein the process comprises selecting, as the test printing target page, a page having a bold-type character from the printing target data.

8. The computer readable medium according to claim 1, wherein the process comprises,
   generating image data in which combination printing settings with a plurality of stages according to the total number of pages in the printing target data are included into one page.

9. The computer readable medium according to claim 1, wherein the process comprises,
   when printing is performed with a two-sided printing function,
   selecting two pages designated by a user from the printing target data comprising one or more pages, and
   generating the image data in which combination printing settings with a plurality of stages regarding each of the selected pages are included on each of a front side and a reverse side.

10. The computer readable medium according to claim 1, wherein the process comprises:
    if printing is to be performed with a two-sided printing function, then:
      selecting, as test printing target pages, two pages having a specific character from the printing target data; and
      generating the image data such that at least two copies of one of the selected two pages are reduced to different scales and provided on a front side of the page and such that at least two copies of the other of the selected two pages are reduced to different scales and provided on a reverse side of the page.

11. The computer readable medium according to claim 1, wherein the process comprises,
    when printing is performed with a two-sided printing function,
    generating image data in which combination printing settings with a plurality of stages regarding the selected page are included into one page, and image data having an ordinary scale of the selected page, each of the image data corresponding to each of a front and a reverse sides.

12. The computer readable medium according to claim 1, wherein the test printing target page is selected automatically by the computer without a user selecting the test printing target page.

13. The computer readable medium according to claim 1, wherein the different respective scaling factors are predetermined.

14. The computer readable medium according to claim 1, wherein the process further comprises:
    receiving a user input identifying one of the plurality of reduced images from the printed test page as being a desired scaling factor for the combination printing function; and
    executing the combination printing function to print a page comprising at least some of the plurality of pages reduced at the desired scaling factor.

15. The computer readable medium according to claim 14, wherein all of the plurality of pages that are printed by the executed combination printing function are printed only at the desired scaling factor.

16. The computer readable medium according to claim 1, wherein each successively smaller one of the plurality of reduced images is rotated approximately 90° relative to a next larger one of the plurality of reduced images.

17. The computer readable medium according to claim 1, wherein the plurality of reduced images are disposed immediately adjacent one another so as to substantially fill the test page.

18. A printing method comprising:
    selecting a test printing target page from printing target data comprising a plurality of pages;
    generating image data in which the selected test printing target page is reduced multiple times to produce a plurality of reduced images of the test printing target page having different respective scaling factors, the plurality of reduced images being collected onto one page; and
    printing a test page using the generated image data, the test page comprising the plurality of reduced images of the test printing target page, wherein each successively smaller one of the plurality of reduced images is approximately one half a size of a next larger one of the plurality of reduced images.

19. The printing method according to claim 18, wherein the selected test printing target page is selected automatically by the computer without a user selecting the test printing target page.

20. The printing method according to claim 18, wherein the different respective scaling factors are predetermined.

21. The printing method according to claim 18, further comprising:
    analyzing the printed test page and determining a smallest recognizable one of the different respective scaling factors; and printing the printing target data at the determined smallest recognizable one of the different respective scaling factors.

22. A non-transitory computer readable medium storing a printer driver having a combination printing function causing a computer to execute a process comprising:
- selecting at least one test printing target page from printing target data comprising a plurality of pages;
- generating image data in which the at least one selected test printing target page is reduced multiple times to produce a plurality of reduced images of the test printing target page having different respective scaling factors, the plurality of reduced images being combined onto one page;
- transmitting the generated image data to a printing device; and
- printing a test page using the generated image data, the test page comprising the plurality of reduced images of the test printing target page, wherein the at least one selected test printing target page is selected automatically by the computer without a user selecting the at least one test printing target page, wherein each successively smaller one of the plurality of reduced images is approximately one half a size of a next larger one of the plurality of reduced images.

23. The computer readable medium according to claim 22, wherein the different respective scaling factors are predetermined.

* * * * *